United States Patent [19]  [11] 3,934,470
Amati et al.  [45] Jan. 27, 1976

[54] METHOD FOR MEASURING THE FLOW RATE OF THE GASES COMING OUT OF AN OXYGEN CONVERTER

[76] Inventors: Giovanni Amati, Via Cavalleggeri d'Aosta 11; Bruno Costa, Via Petrarca 31, both of Naples, Italy

[22] Filed: Nov. 23, 1973

[21] Appl. No.: 418,518

[30] Foreign Application Priority Data
Nov. 30, 1972 Italy.................................. 13049/72

[52] U.S. Cl.................................... 73/194 R; 75/60
[51] Int. Cl.²............................................. G01F 1/70
[58] Field of Search.......... 73/194 R, 194 M; 75/59, 75/60

[56] References Cited
UNITED STATES PATENTS

| | | | |
|---|---|---|---|
| 3,435,659 | 4/1969 | Sternberg............................. | 73/194 |
| 3,435,660 | 4/1969 | Sternberg............................. | 73/194 |
| 3,435,678 | 4/1969 | Sternberg............................. | 73/194 R |
| 3,520,657 | 7/1970 | Frumerman........................ | 75/60 X |
| 3,727,048 | 4/1973 | Haas................................... | 250/43.5 |

*Primary Examiner*—Herbert Goldstein
*Attorney, Agent, or Firm*—Nolte and Nolte

[57] ABSTRACT

In a process for measuring the flow rate of a gas formed in an oxygen conversion process in which conversion process oxygen is introduced into an oxygen converter containing a material to be oxidized and gaseous effluent, including a gas formed in the oxygen converter, is withdrawn, the process is improved by including in the oxygen feed to the converter from 0.15 to 1% by volume argon, as a tracer, and determining the concentration of the argon in the gaseous effluent at the mouth of the converter or at a point before which the effluent gases are mixed with air or pollutant or before which the effluent gases are subjected to a combustion reaction.

2 Claims, 2 Drawing Figures

METHOD FOR MEASURING THE FLOW RATE OF THE GASES COMING OUT OF AN OXYGEN CONVERTER

BACKGROUND OF THE INVENTION

It is known how to measure the flow rate of the smokes, by using a tracer entering the system mixed with the blowing oxygen, and is subsequently defined in the smokes by means of a mass spectrometer.

By denoting with $q_A$ the flow rate of the marking gas and with $C_A$ the concentration thereof outcoming from the converter opening, the flow rate of the smoke $Q_F$ is given by:

$$Q_F = q_A / C_A \qquad (1)$$

Said tracing gas is an inert gas which does not take part in the reactions occurring inside the converter during the refining, the gas used as a tracer being preferably formed by argon. The concentration of said tracer, when argon is used, is according to the known art not higher than 5%. That means that a concentration of argon up to 5% allows to use said measurement method, while a concentration higher than 5%, used with the only purpose of measuring the flow rate of the gases is not convenient either from the economic or the metallurgical point of view, and does not offer any improvement in the measurement exactness.

OBJECT OF THE INVENTION

The object of the present invention, based on tests performed, is to define the experimental conditions necessary for embodying said measurement method, with particular reference to the sampling and the exactness of the device allowing the use of the tracing gas down to the minimum concentration of 0.2%. The convenience of using such argon concentrations is obvious.

SUMMARY OF THE INVENTION

In the method for measuring the flow rate of the gases coming out of an oxygen converter anf therefore also for defining the distribution of oxygen among the various phases of the system wherein, according to the known art, the concentration of a tracing gas which does not take part in the refining reactions is measured and is fed to the converter together with the oxygen, said tracing gas being present in quantities between 1% and 0.15% by volume.

In the above method the argon contained in the oxygen in form of impurities is used as tracing gas.

In the above method the samples of the gases coming out of the converter are collected, according to a preferred embodiment, at the converter mouth or at another point in the gas column where reactions of combustion do not take place or where there is no mixing of air or other polluting gases with effluent.

DESCRIPTION OF THE PREFERRED EMBODIMENTS

Figure 1:
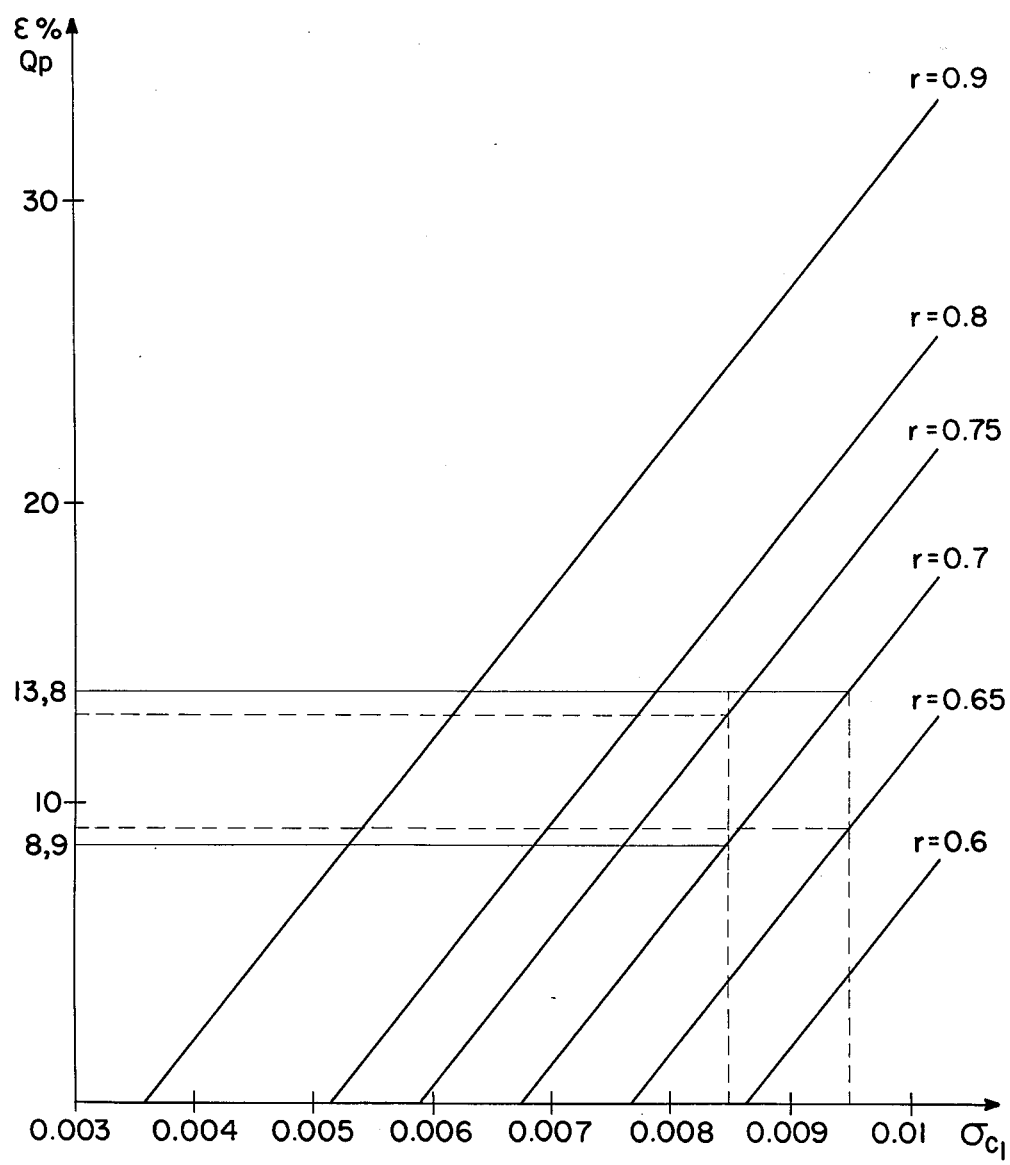
FIG. 1 is a diagram showing the relation between the percentage error in the measurement of the smoke flow rate and the typical difference in the precision of the final carbon for different values of the correlation coefficient, as described hereafter in detail.

Herebelow are reported the range of the exactness values obtainable by the above method, and of the exactness of the needed instruments. As for the sampling and analysis are still considered the test conditions already described in the known art, i.e.:

the gas sample are collected at the converter mouth or in another suitable point of the smoke conduit;

the gas analysis is effected by means of a mass spectrometer.

In the case that argon is the tracing gas, it is to be considered that the air of the surrounding place contains this gas too in a percent of 0.937%; in order to ascertain which part of the argon found in the smokes is coming from the blowing oxigen and which is brought by the air, an analysis of nitrogen in the smoke is employed and a simple system of equations reported herebelow is solved. It is to be appreciated in this case the advantage of collecting the gas at the converter mouth, as in such a way the air interferences are reduced to the minimum. The following symbols are used:

$Q_{O_2}$: the flow rate of the blowing oxygen;

$Q$: the flow rate of the gases developing within the converter;

$Q_A$: the flow rate of the "re-entering" air, that is of the air entering the converter and coming out therefrom mixed with the reaction gases;

$Q_F$: the smoke flow rate resulting from the interference (reaction or simply addition) of the air with the gases developping within the converter.

And further:

$[N_2],[Ar]$: the concentrations of $N_2$ and Ar in the gases developing within the converter (fractions of Q);

$[N_2]_A,[Ar]_A$: the concentrations of $N_2$ and Ar in the air (fractions of $Q_A$);

$[N_2]sp,[Ar]sp$: the concentrations of $N_2$ and Ar measured on the gas samples (fractions of $Q_F$);

$[N_2]_{O_2},[Ar]_{O_2}$: the concentrations of $N_2$ and Ar in the blowing oxygen (fractions of $Q_{O_2}$).

The balances of nitrogen and argon within the converter are expressed by:

$$Q_{O_2}[N_2]_{O_2} = Q[N_2] \qquad (2)$$
$$Q_{O_2}[Ar]_{O_2} = Q[Ar] \qquad (3)$$

The balances of nitrogen and argon at the converter mouth are expressed by:

$$Q_F[N_2]_{sp} = Q[N_2] + Q_A[N_2]_A \qquad (4)$$
$$Q_F[Ar]_{sp} = Q[Ar] + Q_A[Ar]_A \qquad (5)$$

By dividing (5) by (4) and considering (2) and (3) there is obtained:

$$\frac{[Ar]_{sp}}{[N_2]_{sp}} = \frac{Q_{O_2}[Ar]_{O_2} + Q_A[Ar]_A}{Q_{O_2}[N_2]_{O_2} + Q_A[N_2]_A} \qquad (6)$$

By solving (6) with respect to $Q_A$ and replacing the value found in (5), there is obtained:

$$Q_f = Q_{O_2} \frac{[Ar]_{O_2}[N_2]_A - [Ar]_A[N_2]_{O_2}}{[Ar]_{sp}[N_2]_A - [Ar]_A[N_2]_{sp}} \qquad (7)$$

As already said, the values of $[Ar]_A$ and $[N_2]_A$ are known from the literature and may be considered as constant. Therefore, in order to know $Q_F$ it is necessary to measure:

- the flow rate of the blowing oxygen;
- the concentration of argon and nitrogen in the oxygen;
- the concentration of argon and nitrogen in the smokes.

In order to apply the measurement of the smoke flow rate to the control of the refining process by L.D. converter, it is necessary to draw some hypothesis of work: At the base of the dynamic control of the L.D. process already defined in the known art is placed a method based on the differential carbometry, that is on the relation $(dc/dt) = b\ C\%$ valid in the final part of the refining for controlling the concentration ($C$) of carbon at the stop of the refining process, where ($b$) is a suitable coefficient.

Another method for the control of the process is the one based on the instantaneous balance of oxygen: such a method allows an operator to know at any moment which part of the blown oxygen was used for the decarburizing and which part was instead taken by other reactions like the slag oxidation and the oxidation of CO into $CO_2$. To the instantaneous balance of oxygen method, there is entrusted a function of control on the lance height and of the oxygen flow rate, so as to be in position to lead the process through well defined paths to improve its reproducibility.

The measurement method for the smoke flow rate according to the invention (based on the balance of argon used as a tracing gas) and the use of the mass spectrometer (as analytic instrument) are the main components for the application of said two methods.

The measurement method according to the invention together with the gas collection at the converter mouth allows an operator to overcome some limitations of installation (e.g. auxiliary combustion, difficulty of keeping a given efficiency in the measurement system for the smoke flow rate by conventional methods) and at the same time to perform an opportune checking and thus is more suitable to the requirements of the process according to the known art.

The possibility of development of the checking method according to the invention is, however based on the experimental confirmation of certain hypothesis which may be resumed as follows:

A. inherent variability of the process, very low. Such a variability after tests effected is actually to be considered as modest;
B. variability due to the operative conduct, very low. Through the instantaneous balance of oxygen, such a variability may be reduced to acceptable limits.
C. Variability in the calculated value of $cD/dt$, low. This variability depends mainly on the faults of sampling and on the faults inherent to the instruments used.

The possibility of obtaining a good correlation coefficient (which is supposed $= 0.7$) between $dC/dt$ and the concentration of carbon in the bath, in the final step of the blowing, is closely related to the validity of the above hypothesis.

The possibility of use of the differential carbometry in function of the measurement faults is evaluated herebelow:

Starting from the main relation of the decarburizing speed $dC/dt = bC_1$ and solving with respect to $C_1$, it is obtained:

$$C_1 = \frac{1}{b}\ \frac{dC}{dt} = \frac{1}{b} Q_F\ [CO]sp + [CO_2]\ sp \quad (8)$$

as it is $\frac{dC}{dt} = Q_F\ [CO]sp + [CO_2]\ sp$ where $[CO]sp$ and $[CO_2]sp$ are the percents of CO and $CO_2$ is the sample of smokes.

From (8) it is obtained the relative fault of determination of the smoke $\epsilon Q_F$ as a function of the maximum relative fault $\epsilon C_1$ desired on the determination of $C_1$ at the stop, of the relative fault $\epsilon b$ by which the determination of $b$ is affected, and of the relative fault on $[CO]sp + [CO_2]sp$ $$\epsilon Q_F = \epsilon C_1 - \epsilon_b - \epsilon(CO+CO_2) \quad (9)$$

Considering that:

$$\epsilon\ b\% = 3 \cdot 100 \cdot \sqrt{\frac{1-r^2}{N \cdot r^2}} \quad (10)$$

where $N$ is the number of observations and $r$ the correlation coefficient, by supposing to work on a statistic sample of 100 casts, it is obtained:

$$\epsilon\ b\% = 30 \cdot \sqrt{\frac{1-r^2}{r^2}}$$

The table of the values of $\epsilon b\%$ for the various values of $r$ is reported herebelow

TABLE I

| r | $\epsilon\ b\ \%$ |
|---|---|
| 0.5 | 51.96 |
| 0.6 | 40.00 |
| 0.7 | 30.61 |
| 0.8 | 22.50 |
| 0.9 | 14.53 |

Note: by denoting with $\sigma^2_{c_1}$ the residual variance of the equation of precision (8), it may be said that, in first approximation, the maximum precision fault percentual on $C_1$: carbon content present in the bath at the stop is given by:

$$\epsilon\ C_1\% = 3 \times 100\ \frac{\sigma_{C_1}}{C_1}$$

For a level of $C_1 = 0.06\%$ it is possible to draw a table connecting the values of $\sigma C_1$ to the corresponding values of $\epsilon C_1\%$

TABLE II

| $\sigma\ C_1$ | $\epsilon\ C_1\%$ |
|---|---|
| 0.007 | 35 |
| 0.008 | 40 |
| 0.009 | 45 |
| 0.010 | 50 |

It is admitted that with $\epsilon(CO + CO_2)\% = 3$ it is obtained, from (9) the table complete which connects the values of $r$, $\sigma C_1$ and $\epsilon Q_F\%$; the percents and values of the table are also shown in the diagram of FIG. 1 wherein is reported the relation between the percentual fault on the measurement of the smoke flow rate and the typical difference in the precision of the final carbon for different values of the correlation coefficient.

TABLE III

| r | σ C₁ | ε Q_F% |
|---|------|--------|
| 0.5 | 0.007 | −19.96 |
|     | 0.008 | −14.96 |
|     | 0.009 | − 9.96 |
|     | 0.010 | − 4.96 |
| 0.6 | 0.007 | − 8.00 |
|     | 0.008 | − 3.00 |
|     | 0.009 | + 2.00 |
|     | 0;010 | + 7.00 |
| 0.7 | 0.007 | 1.40 |
|     | 0.008 | 6.40 |
|     | 0.009 | 11.40 |
|     | 0.010 | 16.40 |
| 0.8 | 0.007 | 9.50 |
|     | 0.008 | 14.50 |
|     | 0.009 | 19.50 |
|     | 0.010 | 24.50 |
| 0.9 | 0.007 | 17.47 |
|     | 0.008 | 22.47 |
|     | 0.009 | 27.47 |
|     | 0.010 | 32.47 |

All the values corresponding to $\epsilon Q_F$ negative are unacceptable; therefore, they are already incompatible with the value method of $r = 0.5$ and $r = 0.6$, if a good precision on $C_1$ is desired.

From the diagram it may be seen that, supposing a value $\sigma C_1$ between 0.0085 and 0.0095 and a correlation coefficient $r = 0.70$, the admissible value of $\epsilon Q_F$ varies between 8.9 and 13.8.

The precision range for the determination of the smoke flow rate depends on the value of $(r)$ forecast and from the $\sigma C_1$ desired; on the other hand, by succeeding in obtaining a correlation coefficient higher than 0.70, it may be increased the determination precision on $C_1$, being the determination precision of $Q_F$ unchanged. In fact, the diagram shows that for $r = 0.75$, it may obtained $\sigma C_1 = 0.0085$ if $\epsilon Q_F\% = 13$; for $r = 0.65$ it must be $\epsilon Q_F\% = 9.4$ for obtaining $\sigma C_1 = 0.0095$.

It is to be further pointed out that the correlation coefficient $r$ depends on:
A. accuracy in the embodiment of the measurement system (opportuneness, sampling, conditioning, analysis);
B. the installation conditions, the operative practices of the steel mill and the variability of the process.

Now, it is evaluated the influence of the measurement faults on the precision for determining $Q_F$.

By differentiating (7) it may be obtained the maximum absolute fault, $\Delta Q_F$ on $Q_F$:

$$\Delta Q_F = \left| \frac{\delta Q_F}{\delta Q_{o_2}} \right| \cdot Q_{o_2} + \left| \frac{\delta Q_F}{\delta [Ar]_{o_2}} \right| \cdot \Delta [Ar]_{o_2} +$$

-continued $$+ \left| \frac{\delta Q_F}{\delta [N_2]_{o_2}} \right| \cdot \Delta [N_2]_{o_2} + \left| \frac{\delta Q_F}{\delta [Ar]_A} \right| \cdot \Delta [Ar]_A +$$

$$+ \left| \frac{\delta Q_F}{\delta [N_2]_A} \right| \cdot \Delta [N_2]_A + \left| \frac{\delta Q_F}{\delta [Ar]sp} \right| \cdot \Delta [Ar]sp +$$

$$+ \left| \frac{\delta Q_F}{\delta [N_2]_{sp}} \right| \cdot \Delta [N_2]_{sp} \quad (11)$$

Denoting now with $\epsilon Q_F$ the maximum relative fault of the smoke flow rate and with $$(\epsilon Q_F)_x = \frac{1}{Q_F} \cdot \frac{\delta Q_F}{\delta x} \cdot \Delta x$$

the partial contribution of the relative fault of measurement of the generic magnitude $x$ to the fault of determination of $Q_F$, (11) becomes:

$$\epsilon_{Q_F} = |(\epsilon_{Q_F})_{Q_{O2}}| + |(\epsilon_{Q_F})_{[Ar]_{O2}}| + |(\epsilon_{Q_F})_{[N_2]_{O2}}| + |(\epsilon_{Q_F})_{[Ar]_A}| + |(\epsilon_{Q_F})_{[N_2]_A}| + |(\epsilon_{Q_F})_{[Ar]_{sp}}| + |(\epsilon_{Q_F})_{[N_2]_{sp}}| \quad (12)$$

By effecting the calculations it is obtained:

$$(\epsilon_{Q_F})_{O_2} = \epsilon_{Q_{O_2}} \quad (13)$$

$$(\epsilon_{Q_F})_{[Ar]_{O_2}} = \epsilon_{[Ar]_{O_2}} \cdot \left| \frac{1}{1 - \frac{[Ar]_A \cdot [N_2]_{o_2}}{[Ar]_{o_2} \cdot [N_2]_A}} \right| \quad (14)$$

$$(\epsilon_{Q_F})_{[N_2]} = \epsilon_{[N_2]} \cdot \left| \frac{1}{1 - \frac{[Ar]_{o_2} \cdot [N_2]_A}{[Ar]_A \cdot [N_2]_{o_2}}} \right| \quad (15)$$

$$(\epsilon_{Q_F})_{[Ar]_A} = \epsilon_{[Ar]_A} \cdot \left| \frac{1}{\frac{[Ar]_{sp} \cdot [N_2]_A}{[Ar]_A \cdot [N_2]_{sp}} - 1} - \frac{1}{\frac{[Ar]_{o_2} \cdot [N_2]_A}{[Ar]_A \cdot [N_2]_{o_2}} - 1} \right| \quad (16)$$

$$(\epsilon_{Q_F})_{[N_2]_A} = \epsilon_{[N_2]_A} \cdot \left| \frac{1}{1 - \frac{[Ar]_A \cdot [N_2]_{o_2}}{[Ar]_{o_2} \cdot [N_2]_A}} - \frac{1}{1 - \frac{[Ar]_A \cdot [N_2]_{sp}}{[Ar]_{sp} \cdot [N_2]_A}} \right| \quad (17)$$

$$(\epsilon_{Q_F})_{[Ar]_{sp}} = \epsilon_{[Ar]_{sp}} \cdot \left| \frac{1}{1 - \frac{[Ar]_A \cdot [N_2]_{sp}}{[Ar]_{sp} \cdot [N_2]_A}} \right| \quad (18)$$

$$(\epsilon_{Q_F})_{[N_2]_{sp}} = \epsilon_{[N_2]_{sp}} \cdot \left| \frac{-1}{1 - \frac{[Ar]_{sp} \cdot [N_2]_A}{[Ar]_A \cdot [N_2]_{sp}}} \right| \quad (19)$$

In the formulae (14) − (19) appear two quantities which are independent of any modality of embodiment: they are $[Ar]_A$ and $[N_2]_A$ which, according to the elements reported by the literature, are equal to 0.00937 and 0.7806; the other quantites, that is $[Ar]_{o_2}$, $[N_2]_{o_2}$, $[Ar]_{sp}$, $[N_2]_{sp}$, depends closely on the kind of embodiment and the following statements concern the advantages and disadvantages of the various embodiments.

A. Blowing of oxygen containing argon in a percent of 1% and sampling of the gas at the converter mouth. This first point relates to what suggested by the known art. It is supposed to blow oxygen into the converter, with a percent of 1% of argon in the oxygen. Such a composition may be obtained either by adding argon to the pure oxygen, or operating the device producing oxygen in such a way as to provide oxygen with the desired percent of argon. It is not necessary that the argon percent is exactly 1%, it is simply sufficient that it is known with a precision which will be indicated later on. The sampling at the converter mouth require that the probe is well immersed in the column of gas coming out of the converter; in these conditions, as the re-enterings of air inside the column are very low since only the outer part of the gas column is interested in the combustion, the gaseous sample is polluted by the air only in a minimum proportion. The statements are backed by tests effected on the converters of the applicants' steel mill.

Therefore, in the above case, it may be considered that in the critical portion of decrease in the decarburizing speed there is:
$[Ar]sp = 1\%$, $[N_2]sp = 2\%$
and further:
$[Ar]O_2 = m\%$, $[N_2]O_2 = 0.1\%$
By replacing said values in formulae (14) – (19), it is obtained:

$$(\epsilon Q_F)_t Ar_{|O_2} = 1.0012 \cdot \epsilon_t AR_{|O_2} \quad (14')$$
$$(\epsilon Q_F)_t N_{2|O_2} = 0.0012 \cdot \epsilon_t N_{2|O_2} \quad (15')$$
$$(\epsilon Q_F)_t Ar_{|A} = 0.0234 \cdot \epsilon_t Ar_{|A} \quad (16')$$
$$(\epsilon Q_F)_t N_{2|A} = 0.0234 \cdot \epsilon_t N_{2|A} \quad (17')$$
$$(\epsilon Q_F)_t Ar_{|sp} = 1.0246 \cdot \epsilon_t Ar_{|sp} \quad (18')$$
$$(\epsilon Q_F)_t N_{2|sp} = 0.0246 \cdot \mu_t N_{2|sp} \quad (19')$$

B. Blowing of oxygen containing argon in a percent of 0.2% and sampling of gas at the converter mouth. In the case it is blown oxygen containing argon at the impurity level (0.2%) and the sampling of gas is effected at the mouth, as for the sampling is concerned the same considerations reported in the above paragraph are valid.

It varies only the concentration of $[Ar]_{sp}$ in the smokes that, in the critical portion of decrease in the decarburizing speed, may be considered with an average value of 0.2%.

By still putting $[N_2]_{O_2} = 0.1\%$ and $[N_2]_{sp} = 2\%$, and replacing these values in the formulae (14) – (19), it is obtained:

$$(\epsilon_{Q_F})_t Ar_{|O_2} = 1.0060 \cdot \epsilon_t Ar_{|O_2} \quad (14'')$$
$$(\epsilon_{Q_F})_t N_{2|O_2} = 0.0060 \cdot \epsilon_t N_{2|O_2} \quad (15'')$$
$$(\epsilon_{Q_F})_t Ar_{|A} = 0.1304 \cdot \epsilon_t Ar_{|A} \quad (16'')$$
$$(\epsilon_{Q_F})_t N_{2|A} = 0.1304 \cdot \epsilon_t N_{2|A} \quad (17'')$$
$$(\epsilon_{Q_F})_t Ar_{|sp} = 1.1364 \cdot \epsilon_t Ar_{|sp} \quad (18'')$$
$$(\epsilon_{Q_F})_t N_{2|sp} = 0.1364 \cdot \epsilon_t N_{2|sp} \quad (19'')$$

C. Sampling of the gas in another point of the smoke conduit without any additional addition of argon.

In the case of a sampling of the gas at a point of a smoke conduit different of the converter mouth, the following three cases may be considered:

I. The sample is collected in a point where the column of the gas coming out of the converter is not yet interested in reactions of combustion with the re-entering air: in this case the same considerations stated for the sample collection at the converter mouth are valid.

II. The sample is collected in a point where in the smoke conduit the reaction of combustion between the converter gas and the air is still occurring: this possibility, owing to the obvious failure of homogeneity is to be avoided at all.

III. The sample is collected in a point where the reaction between the converter gas and the re-entering air is almost complete. About this case the following hypothesis are made:
a. Q being the flow rate of the smokes coming out of the converter and $Q_{O_2}$ the oxygen flow rate, in the critical period of decrease in the decarburizing speed, the mean value is $Q = Q_0$
b. Considering an installation with combustion of the smokes in the boiler, by denoting with $Q_v$ the sucker rate and $Q_R$ the re-entering air rate, it is obtained:
$Q_v \approx Q + Q_R \approx 8 Q_0$
c. The gas coming out of the converter consists of 85% of CO and 15% of $CO_2$.

The ratio $[AR]_{sp} [N_2]_{sp}$ is given by:

$$\frac{[Ar]_{sp}}{[N_2]_{sp}} = \frac{0.00937 \, Q_R + 0.002 \, Q}{0.7806 \, Q_R} = 0.01236$$

The values of $[Ar]_{sp}$ and $[N_2]_{sp}$ in the hypothesis of nerly complete combustion are:
$[Ar]_{sp} = 0.008922$
$[N_2]_{sp} = 0.7213$
By using said numeral values and replacing them in the formulae (14) – (19), it is obtained:

$$(\epsilon_{Q_F})_t Ar_{|O_2} = 1.0060 \cdot \epsilon_t Ar_{|O_2} \quad (14''')$$
$$(\epsilon_{Q_F})_t N_{2|O_2} = 0.00060 \cdot \epsilon_t N_{2|O_2} \quad (15''')$$
$$(\epsilon_{Q_F})_t Ar_{|A} = 32.8134 \cdot \epsilon_t Ar_{|A} \quad (16''')$$
$$(\epsilon_{Q_F})_t N_{2|A} = 32.8134 \cdot \epsilon_t N_{2|A} \quad (17''')$$
$$(\epsilon_{Q_F})_t Ar_{|sp} = 33.8194 \cdot \epsilon_t Ar_{|sp} \quad (18''')$$
$$(\epsilon_{Q_F})_t N_{2|sp} = 32.8194 \cdot \epsilon_t N_{2|sp} \quad (19''')$$

Table IV shows the results of the calculations made above.

TABLE IV

| $QO_2$ | Sampling at the mouth; $[Ar]_{O_2} = 0.01$ | $\delta Q_F/\delta X$ Sampling at the mouth; $[Ar]_{O_2} = 0.002$ | Sampling in the boiler $[Ar]_{O_2} = 0.002$ |
|---|---|---|---|
| | 1 | 1 | 1 |
| $[Ar]O_2$ | 1.0012 | 1.0060 | 1.0060 |
| $[N_2]O_2$ | 0.0012 | 0.0060 | 0.0060 |
| $[Ar]_A$ | 0.0234 | 0.1304 | 32.8134 |
| $[N_2]_A$ | 0.0234 | 0.1304 | 32.8134 |
| $[Ar]_{sp}$ | 1.0246 | 1.1364 | 33.8194 |
| $[N_2]_{sp}$ | 0.0246 | 0.1364 | 32.8194 |

The table results are:
1. Tje fault of measurement of the oxygen flow rate is brought completely on the measurement of the smoke flow rate.
2. There is no remarkable difference between the three types of embodiment as for the coefficients on the fault of measurement of the quantities $[Ar]_{O_2}$ and $[N_2]_{O_2}$.
3. The most considerable differences concern: the coefficient of the relative fault of measurement of the quantities $[Ar]_A$, $[N_2]_A$, $[Ar]_{sp}$, $[N_2]_{sp}$.

To this end it is to be recalled that in case of a correlation coefficient between $dC/dt$ and $C_1$ of 0.7, for obtaining a $\sigma C_1$ between 0.0085 and 0.0095 it is necessary that $\epsilon Q_F\%$ is comprised between 8.9 and 13.8. In the case of sampling in the boiler, the coefficient of the fault in the measurement of argon is 33.8; considering the present status of the art, it is quite difficult that a mass spectrometer may measure the argon, at the level of 0.89% with a precision better than 1%; consequently, it is clear that the method cannot be used in such an embodiment.

The process control through a sampling of the smokes in the boiler is possible only in two instances:
1. Installation for recovering the smokes without any combustion (O.G. system): in this case the conditions already considered with the sampling at the mouth practically occur again.
2. Refining processes using high concentrations of argon, as for instance in the argon-oxygen processes for obtaining stainless steels.

On the contrary, in the case of the L.D. and L.D.-AC process, and with recovery installations comprising the combustion of the gas, it remains valid only in a case consisting of sampling the gas at the converter mouth or in another equivalent point with blowing of oxygen containing argon with a concentration from 0.2% up to 1% (and possibly up to 5%).

Now reference is made to the precision characteristics of the mass spectrometer necessary for performing the measurement of the smoke flow rate.

In the case oxygen containing argon with a concentration of 0.2% is blown, the conclusions are obviously valid even in the case oxygen with a higher concentration of argon is blown; in this case, with the same instruments, it is obtained a better precision on the measurement of $Q_F$ and thus of $C_1$ or, with the same precision in the measurement of $C_1$, it will be possible to use instruments with lower precision features.

Supposing that:

A. The fault connected to the variability of argon and nitrogen present in the air is negligible as the quantities $[Ar]_A$ and $[N_2]_A$ are known and constant.
B. The fault concerning the gas sampling at the mouth is of 2%.
C. The maximum fault of measurement of the oxygen flow rate is of 3%.
D. The sampling fault in defining the argon in the oxygen is negligible.
E. The correlation coefficient between $dC/dt$ and $C_1$ reaches 0.7 on a group of 100 casts.

For the value of 0.9 of $\epsilon Q_F\%$, considering only the most important contribution, it is obtained, on the ground of (12):

$8.9 = 3 + 1.0060\ \epsilon[Ar]_{o_2}\% + 1.1364.\ \epsilon[Ar]_{sp}\%$
$1.0060\ \epsilon[Ar]_{o_2}\% + 1.1364\ \epsilon[Ar]_{sp}\% = 5.9$ Considering what supposed at point (B):
$1.0060\ \epsilon[Ar]_{o_2}\% + 1.1364\ \epsilon[Ar]_{sp}\% = 3.9$ The two quantities $[Ar]_{o_2}\%$ and $[Ar]_{sp}\%$, once that $\epsilon[Ar]_{sp}\%$ has been depurated of the sampling fault may be considered as sufficiently homogeneous and thus it may be said:

$\epsilon[Ar]_{o_2}\% \approx \epsilon[Ar]_{sp}\% = 1.8$

However, in this case and with the value of $Q_F\% = 8.9$, there is not any margin of fault to face possible unexpected occurencies. Possible margins may be obtained only in the hypothesis of improving the precision of the analysis of $[Ar]_{o_2}$, $[Ar]_{sp}$, $[CO]$, and $[CO_2]$.

For the value of $Q_F\% = 13.8$, it is accordingly obtained:
$1.0060\ \epsilon[Ar]_{o_2}\% + 1.1364\ \epsilon[Ar]_{sp}\% = 8.8$ If it is desired to keep a fault margin of 3%, the average maximum relative percentual value is on $[Ar]_{sp}$ and $[Ar]_{o_2}$, and which may be considered of 2.7%. Therefore, the necessary precision range for the various components is:

$\left.\begin{array}{l}\epsilon[Ar]_{o_2}\% \\ \epsilon[Ar]_{sp}\%\end{array}\right\}\quad 1.8 + 2.7$ $\left.\begin{array}{l}\epsilon[CO]\% \\ \epsilon[CO_2]\% \\ \epsilon[N_2]_o\ \% \\ \epsilon[N_2]_{sp}\%\end{array}\right\}\quad \begin{array}{l}1.2 + 2 \\ \\ 2 + 3\end{array}$ The values $\epsilon[N_2]_o\%$ and $\epsilon[N_2]_{sp}\%$ are given as orientative values, considering the low contribution to the fault of the definition of $Q_F$ as above said.

Figure 2:
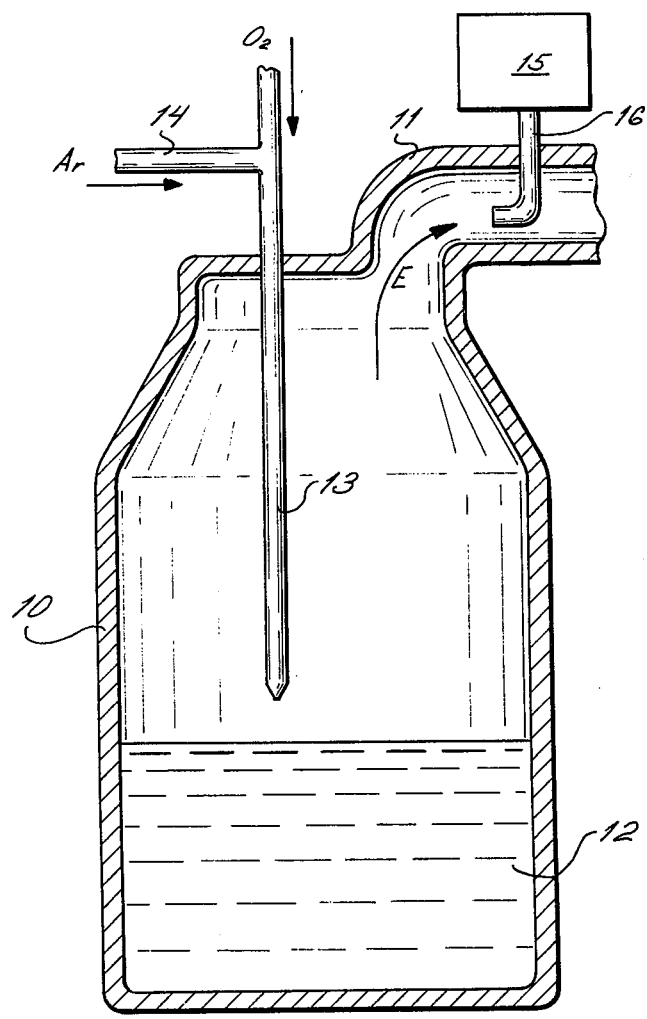
FIG. 2 is a schematic diagram of an embodiment of the invnetion in operation.

The valus of $\epsilon[CO]\%$ and $\epsilon[CO_2]\%$ must satisfy, within the above mentioned range, the condition:
$\epsilon[CO]\% + \epsilon[CO_2]\% = 3.2$ With reference to an example of the practice of the invention in connection with the L. D. process, in FIG. 2, a schematic representation, is illustrated, in cross section, an L. D. process vessel 10 (see, for example, Steel, 43:27, October, 1958) provided with a conduit 11 for effluent E. The charge 12 to be refined partially fills the vessel 10. Downwardly through a lance 13 into contact with the charge 12 is fed an oxygen stream. A conduit 14 communicates with the upper portion of the lance 13. Argon is fed through the conduit 14 and mixes and is carried with the oxygen through the lance 13 into the vessel 10. An analyzer 15 for determining the concentration of the argon in the effluent is provided with a sampling inlet conduit which extends into the conduit 11 for sampling the effluent.

It is to be understood that the invention is not limited to the examples shown.

It is intended to cover all modifications and equivalents within the scope of the appended claims. What we claim is:

1. In a process for measuring the flow rate of a gas formed in an oxygen conversion process which conversion process is carried out by introducing oxygen into an oxygen converter containing a material to be oxidized and gaseous effluent, including a gas formed in said oxygen converter, are withdrawn, the improvement which comprises including in the oxygen feed to said converter between 0.15 and 1% by volume argon, as a tracer, and determining the concentration of said argon in the gaseous effluent at the mouth of the converter or at a point before which the effluent gases are mixed with air or pollutant or before which the effluent gases are subjected to a combustion reaction.

2. In a process according to claim 1, in the improvement in which the determining of the concentration of said argon in the gaseous effluent is at the month of the converter.

* * * * *